United States Patent
Kupratis et al.

(10) Patent No.: US 11,326,467 B2
(45) Date of Patent: May 10, 2022

(54) DUAL DRIVE ELECTRO-AERO-THERMAL TURBINE ENGINE

(71) Applicant: Raytheon Technologies Corporation, Farmington, CT (US)

(72) Inventors: Daniel Bernard Kupratis, Wallingford, CT (US); Zubair Ahmed Baig, South Windsor, CT (US); Gary Collopy, Vernon, CT (US); Coy Bruce Wood, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 38 days.

(21) Appl. No.: 16/900,199

(22) Filed: Jun. 12, 2020

(65) Prior Publication Data
US 2020/0392904 A1 Dec. 17, 2020

Related U.S. Application Data

(60) Provisional application No. 62/861,678, filed on Jun. 14, 2019, provisional application No. 62/861,749, (Continued)

(51) Int. Cl.
*F01D 15/10* (2006.01)
*F01D 25/24* (2006.01)
(Continued)

(52) U.S. Cl.
CPC ............. *F01D 15/10* (2013.01); *F01D 25/24* (2013.01); *F02C 7/32* (2013.01); *F02C 7/36* (2013.01);
(Continued)

(58) Field of Classification Search
None
See application file for complete search history.

(56) References Cited

U.S. PATENT DOCUMENTS

| | | | |
|---|---|---|---|
| 6,082,967 A * | 7/2000 | Loisy | F02C 7/36 416/129 |
| 6,895,741 B2 * | 5/2005 | Rago | F02C 7/36 60/793 |

(Continued)

FOREIGN PATENT DOCUMENTS

| | | |
|---|---|---|
| EP | 3633165 A1 | 4/2020 |
| EP | 3751111 A1 | 12/2020 |

(Continued)

OTHER PUBLICATIONS

European Search Report for European Application No. 20180038.0 dated Nov. 10, 2020.
(Continued)

*Primary Examiner* — Jason H Duger
(74) *Attorney, Agent, or Firm* — Carlson, Gaskey & Olds, P.C.

(57) ABSTRACT

A turbine engine includes integrated electric machines in the compressor section and the turbine section to supplement power produced from fuel with electric power. The compressor section includes a compressor electric motor that is electrically coupled to a compressor generator. The example turbine section includes a turbine electric motor that is coupled to a geared architecture to supplement power driving the fan section. A turbine generator driven by a portion of the turbine section provides electric power to the turbine electric motor.

20 Claims, 11 Drawing Sheets

Related U.S. Application Data filed on Jun. 14, 2019, provisional application No. 62/861,727, filed on Jun. 14, 2019.

(51) Int. Cl.
 *F02C 7/32* (2006.01)
 *F02C 7/36* (2006.01)
 *F02K 3/06* (2006.01)
 *B64D 27/02* (2006.01)

(52) U.S. Cl.
 CPC .......... *F02K 3/06* (2013.01); *B64D 2027/026* (2013.01); *F05D 2220/50* (2013.01); *F05D 2220/76* (2013.01)

(56) References Cited

U.S. PATENT DOCUMENTS

| | | | |
|---|---|---|---|
| 7,363,757 B2* | 4/2008 | Loisy | F02C 3/113 |
| | | | 60/226.1 |
| 8,191,352 B2* | 6/2012 | Schilling | F02K 3/072 |
| | | | 416/126 |
| 8,231,341 B2* | 7/2012 | Anderson | F04D 29/542 |
| | | | 415/181 |
| 9,822,703 B2 | 11/2017 | Yu et al. | |
| 9,938,850 B2* | 4/2018 | Edwards | F02C 3/113 |
| 10,060,357 B2 | 8/2018 | Adams et al. | |
| 10,240,477 B2 | 3/2019 | Ettridge et al. | |
| 2004/0255590 A1 | 12/2004 | Rago et al. | |
| 2010/0126178 A1 | 5/2010 | Hyde et al. | |
| 2015/0267788 A1 | 9/2015 | Ishihara | |
| 2016/0160867 A1 | 6/2016 | Gehlot | |
| 2016/0229549 A1 | 8/2016 | Mitrovic et al. | |
| 2017/0082033 A1 | 3/2017 | Wu et al. | |
| 2017/0349293 A1 | 12/2017 | Klemen et al. | |
| 2018/0003071 A1 | 1/2018 | Lents et al. | |
| 2019/0128181 A1* | 5/2019 | Smith | F02C 3/107 |
| 2019/0145322 A1 | 5/2019 | Sellick et al. | |
| 2019/0368424 A1 | 12/2019 | Kupratis et al. | |
| 2020/0003115 A1* | 1/2020 | Jones | F02C 3/073 |

FOREIGN PATENT DOCUMENTS

| | | |
|---|---|---|
| RO | 133355 | 5/2019 |
| WO | 2017036657 A1 | 3/2017 |
| WO | 2018203941 A2 | 11/2018 |

OTHER PUBLICATIONS

European Search Report for European Application No. 20180046.3 dated Dec. 1, 2020.

Search Report for Application No. GB2014189.1 dated Mar. 3, 2021.

European Search Report for European Application No. 19201732.5 dated Feb. 26, 2020.

* cited by examiner

FIG.13

DUAL DRIVE ELECTRO-AERO-THERMAL TURBINE ENGINE

REFERENCE TO RELATED APPLICATION

This application claims priority to U.S. Provisional Application Ser. Nos. 62/861,678; 62/861,727 and 62/861,749 all filed on Jun. 14, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. Electric generators and motors have been incorporated into engines to produce electric energy for various engine and aircraft support systems. However, primary power production and operation relies on conversion of the high-energy exhaust gas flow into mechanical power. Integration of electric motors into operation of turbine engines is of increasing interest to improve engine efficiencies.

Turbine engine manufacturers continually seek improvements to engine performance including improvements to thermal, transfer and propulsive efficiencies.

SUMMARY

A turbine engine according to an exemplary embodiment of this disclosure, among other possible things includes a high pressure compressor section that includes a first compressor section and a second compressor section that is disposed serially along an engine longitudinal axis. The first compressor section is axially forward of the second compressor section and is configured to be driven separately from the second compressor section. The turbine engine further includes a compressor motor that is coupled to drive the first compressor section, a combustor in flow communication with both the first compressor section and second compressor section of the high pressure compressor, a first turbine section in flow communication with the combustor and coupled to drive second compressor section, and a fan drive system that is axially aft of the first turbine section and is configured to drive a fan section. The fan drive system includes a second turbine section, a turbine motor and a geared architecture. The second turbine section and the turbine motor are coupled to portions of the geared architecture to drive the fan section.

In a further embodiment of the foregoing, the turbine engine includes a compressor generator that is coupled to be driven by the first turbine section. The compressor generator is electrically coupled to provide electric power to the compressor motor.

In a further embodiment of any of the foregoing, the turbine engine includes a first clutch that is configured to selectively couple a shaft that is driven by the first turbine to the first compressor section and a second clutch that is configured to decouple the compressor motor from driving the second compressor section such that the first turbine section is coupled to drive both the first compressor section and the second compressor section.

In a further embodiment of any of the foregoing, the turbine engine includes a compressor drive control that matches operation of the compressor generator to output requirements of the compressor motor to coordinate operation of the second compressor section with operation of the first compressor section.

In a further embodiment of any of the foregoing, the second turbine section includes an intermediate turbine that is coupled to drive a turbine generator and a low turbine is coupled to a portion of the geared architecture. The turbine generator is electrically coupled to provide electric power to the turbine motor.

In a further embodiment of any of the foregoing, the turbine engine includes a turbine drive control that matches operation of the turbine generator to output requirements of the turbine motor.

In a further embodiment of any of the foregoing, the geared architecture includes a sun gear that is intermeshed with intermediate gears that are supported in a carrier and a ring gear that circumscribe the intermediate gears and the low pressure turbine and the turbine motor are coupled to the sun gear and the fan section is coupled to be driven by the ring gear.

In a further embodiment of any of the foregoing, the turbine engine includes an intermediate shaft that couples the intermediate pressure turbine to the turbine generator through a central opening in the sun gear.

In a further embodiment of any of the foregoing, the geared architecture includes a sun gear that is intermeshed with intermediate gears that are supported in a carrier and a ring gear that circumscribe the intermediate gears and the second turbine section includes an intermediate turbine that is coupled to drive the sun gear and a low turbine that is coupled to drive a turbine generator that is electrically coupled to provide electric power to the turbine motor.

In a further embodiment of any of the foregoing, the turbine engine includes a battery system that is electrically coupled to each of the turbine motor and the compressor motor to supplement power that is provided by a corresponding one of the turbine generator and the compressor generator.

In a further embodiment of any of the foregoing, the turbine engine includes a diffuser that is configured to communicate airflow from the first compressor section and the second compressor section separately to the combustor.

In a further embodiment of any of the foregoing, the diffuser includes a plurality of first conduits that extend from the first compressor section to the combustor and a plurality of second conduits that extend from the second compressor section to the combustor. The plurality of first conduits and the plurality of second conduits alternate circumferentially about the combustor section.

In a further embodiment of any of the foregoing, the turbine engine includes a low pressure compressor that is forward of the high pressure compressor section. The low pressure compressor is coupled to be driven by the compressor motor.

In a further embodiment of any of the foregoing, the turbine engine includes a low pressure compressor clutch that is disposed between the compressor motor that is configured to selectively engage operation of the low pressure compressor.

In a further embodiment of any of the foregoing, the turbine engine includes an inner duct that is configured to communicate core flow to the first compressor section and an outer duct that is configured to communicate core flow to the second compressor section.

In a further embodiment of any of the foregoing, the first compressor section and the second compressor section generate a total output airflow that is communicated to the combustor section. The total output airflow includes a first output airflow from the first compressor section and a second output airflow from the second compressor section.

A method of operating a turbine engine according to an exemplary embodiment of this disclosure, among other possible things includes coupling a first compressor section to a first turbine, coupling a second compressor section to a compressor motor, generating a first airflow from the first compressor section that is separate from a second airflow that is generated by the second compressor section, configuring a combustor to receive the first airflow independent from the second airflow, and coupling a fan to a fan drive system that is disposed aft of the combustor. The fan drive system includes a second turbine section, a turbine motor and a geared architecture. The second turbine section and the turbine motor are coupled to drive the fan through the geared architecture.

In a further embodiment of any of the foregoing, the method includes driving a compressor generator with the first turbine and electrically coupling the compressor generator to drive the compressor motor.

In a further embodiment of any of the foregoing, the method includes driving a turbine generator with the second turbine section and electrically coupling the turbine generator to drive the turbine motor.

In a further embodiment of any of the foregoing, the method includes supplementing power that is transferred through the geared architecture with the turbine motor, and electrically coupling a battery system to each of the turbine motor and the compressor motor to supplement electric power that is provided by a corresponding one of the turbine generator and the compressor generator.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Disclosed gas turbine engines integrate electric generators and motors into a hybrid electro-aero-thermal turbine engine. In the example turbine engines, fuel and electricity are converted to mechanical power to increase kinetic energy of flows through the engine. Conversion of fuel to mechanical power is accomplished by combining the fuel with high pressure air and igniting the mixture to produce a high energy gas flow. The high energy gas flow is converted to mechanical energy as it expands through the turbine section. An electro-chemical potential of energy stored in a battery is converted to mechanical power by electric motors to increase kinetic energy of engine flows. Conversion of fuel to mechanical power is not as efficient as the conversion of electro-chemical potential to mechanical power. The disclosed example engines integrate fuel and electro-chemical power to improve overall engine efficiencies.

Figure 1:
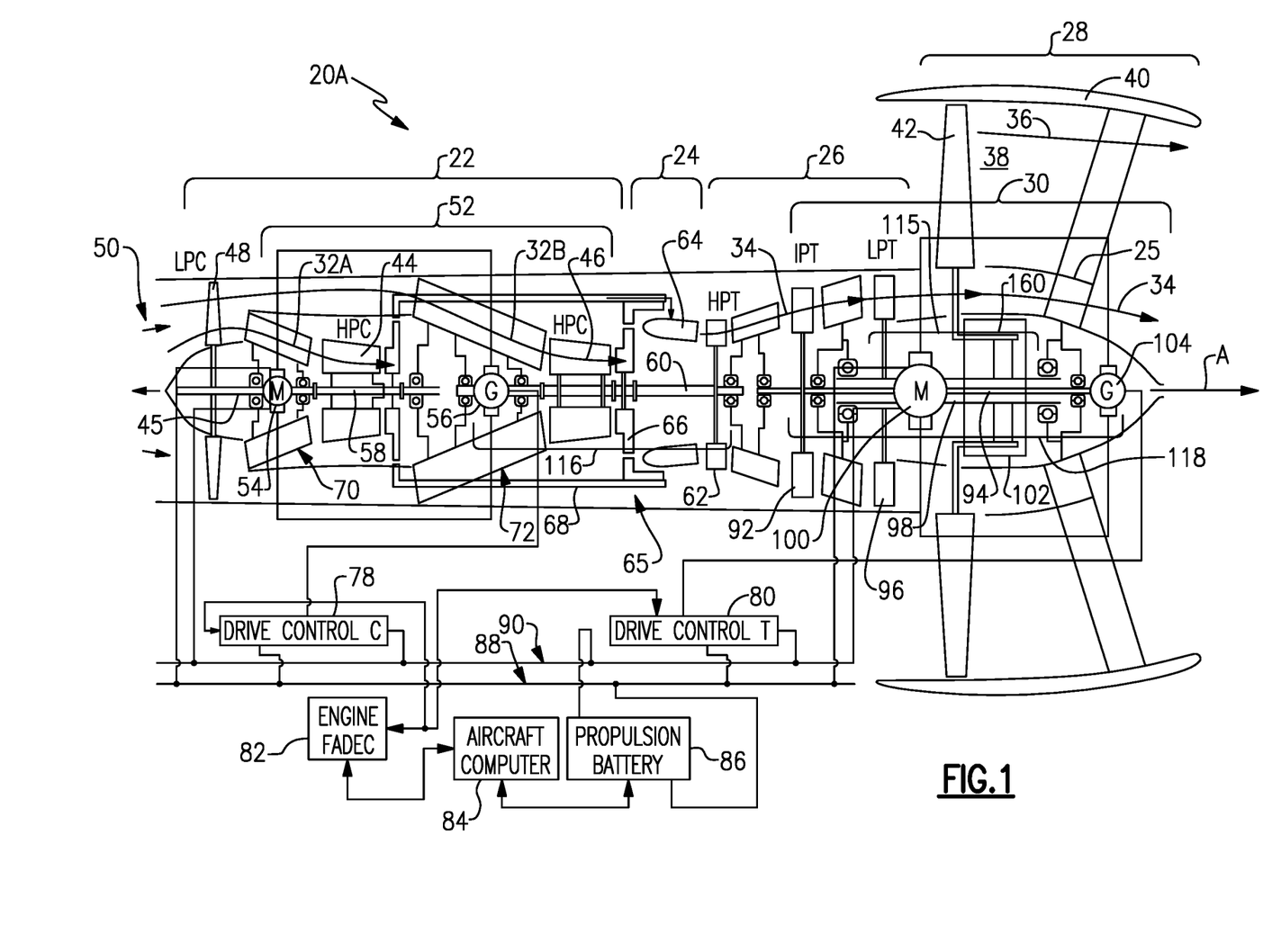
FIG. 1 is a schematic view of an example turbine engine embodiment.

Referring to FIG. 1, a disclosed integrated engine architecture is schematically indicated at 20A. The engine 20A is a ducted fan turbine engine with fan blades 42 of a fan section 28 directing airflow 36 through a bypass flow path 38 defined through a nacelle 40. The engine 20A includes a compressor section 22, a combustor section 24, a turbine section 26 and the fan section 28 arranged serially along an engine longitudinal axis A. The fan section 28 is disposed axially aft of the turbine section 26.

The engine 20A includes integrated electric machines in the compressor section 22 and the turbine section 26 to supplement power produced from fuel with electric power. The example compressor section 22 includes a compressor electric motor 54 that is electrically coupled to a compressor generator 56. The example turbine section 26 includes a turbine electric motor 100 that is coupled to a geared architecture 102 to supplement power driving the fan section 28. A turbine generator 104 driven by a portion of the turbine section 26 provides electric power to the turbine electric motor 100.

The compressor section 22 receives airflow through inlet 50 and supplies compressed air to the combustor 64. Fuel is combined with compressed air from the compressor section 22 and ignited in the combustor 64 to generate a high energy exhaust gas flow 34. The high energy exhaust gas flow 34 expands through the turbine section 26 to drive rotation of the turbine section 26.

The compressor section 22 includes a low pressure compressor section 48 that is axially forward of a high pressure compressor assembly 52. The terms "low" and "high" relate to relative operating pressures between the low pressure compressor section 48 and the high pressure compressor section 52. The inlet airflow is initially compressed by the low pressure compressor 48 and communicated aft to the high pressure compressor assembly 52.

The high pressure compressor assembly 52 includes a first compressor section 44 and a second compressor section 46 that operate independent of each other to provide compressed airflow to the combustor 64. Airflow exiting the low pressure compressor 48 is split into a first core airflow 32A and a second core airflow 32B. The first core airflow 32A is communicated through an inner duct 70 to the first compressor section 44. The second core airflow 32B is communicated through an outer duct 72 to the second compressor section 46. The inner duct 70 is radially inward and axially forward of the outer duct 72. The inner duct 70 and outer duct 72 maybe disposed annularly about the axis A.

The first compressor section 44 is coupled to the compressor motor 54 by motor shaft 58. The low pressure compressor 48 is also driven by a forward shaft 45 coupled to the compressor motor 54. The second compressor section 46 is aft of the first compressor section 44 and is coupled to a high pressure turbine 62 by shaft 60. The first compressor section 44 and the second compressor section 46 may therefore operate and rotate independent of each other. The high pressure turbine 62 drives the compressor generator 56 that is also coupled to the shaft 60. The compressor generator 56 creates electric power that is utilized to drive the compressor motor 54.

In this example, the first compressor section 44 and the second compressor section 46 are configured such that they provide an airflow at a common pressure and volume to the combustor 64. The compressor electric motor 54 drives the first compressor section 44 to match operation of the second compressor section 46 that is driven by the high pressure turbine 62. The first compressor section 44 does not induce a load on the high pressure turbine section 62, but still provides a portion of the compressed air utilized in the combustor 64 to generate the high energy gas flow 34.

Figure 2:
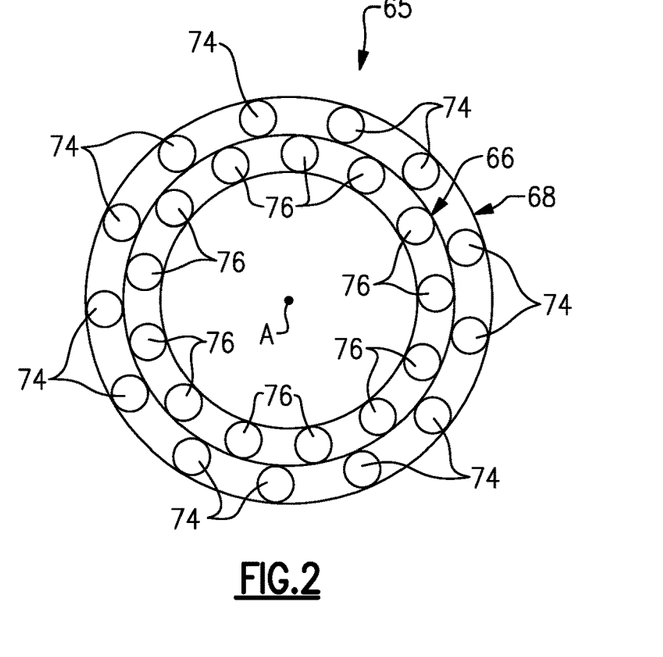
FIG. 2 is an axial view of a portion of an example diffuser assembly.
Figure 3:
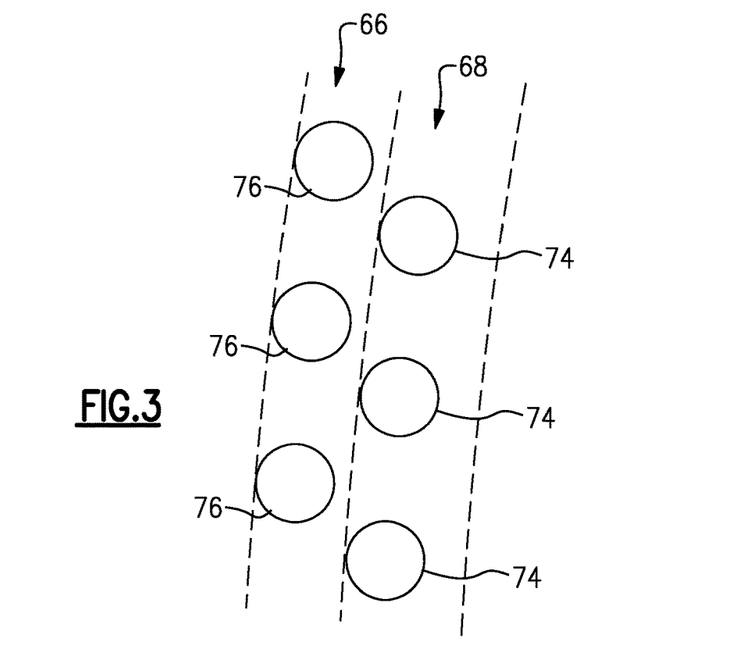
FIG. 3 is a radial view of another portion of the example diffuser assembly

Referring to FIGS. 2 and 3 with continued reference to FIG. 1, the example high pressure compressor assembly 52 supplies compressed airflow from both the first compressor section 44 and the second compressor section 46 to the combustor 64 through a diffuser assembly 65.

The example diffuser assembly 65 includes first conduits 68 with first outlets 74 that communicate airflow from the first compressor section 44 to the combustor 64. The diffuser assembly 65 includes second conduits 66 with second outlets 76 that communicate airflow from the second compressor section 46 to the combustor 64. The first and second conduits 66, 68 extend forward and spaced circumferentially about the combustor 64. In this disclosed example, the first outlets 74 alternate circumferentially with the second outlets 76 about the combustor 64 to provide a uniform distribution of the airflows 32A, 32B from respective compressor sections 44, 46. In one disclosed embodiment, the number of first conduits 68 and second conduits 66 are the same.

The serial arranged axial positions of the first compressor section 44 and the second compressor section 46 results in the first compressor section 44 being spaced axially further from the combustor 64 than the second compressor 46. Accordingly, the first conduits 68 are axially longer than the second conduits 66. The difference in axial length between the first conduits 68 and the second conduits 66 may result in differences in airflow characteristics at respective outlets 74, 76. Accordingly, in another disclosed embodiment, the number and flow areas of the first conduits 68 and the second conduits 66 may be different to accommodate differences in airflow characteristics caused by the different axial distance. Moreover, although the disclosed outlets 74, 76 are disclosed as being substantially round, other shapes could be utilized and are within the contemplation of this disclosure.

In one disclosed embodiment, the first airflow 32A through the first conduits 68 from the first compressor section 44 is substantially equal to a second airflow 32B through the second conduits 66 from the second compressor section 46. Because the first compressor section 44 is powered by the compressor electric motor 54, the first compressor section 44 does not induce a load on the high pressure turbine 62. Reducing the load on the high pressure turbine 62 provides structural changes that can improve engine efficiency. The reduced load on the high pressure turbine 62 can improve reaction changes between engine operating conditions. Accordingly, the high pressure turbine 62 may react faster to changes in throttle positions to provide different engine thrust levels.

Additionally, a lower capacity high pressure turbine 62 may be utilized due to the reduction in load requirements. Alternatively, the high pressure turbine 62 may be sized to accommodate loads for operating conditions that occur most often during an engine operating cycle. For example, the high pressure turbine 62 could be sized and configured to operate the second compressor section 46 to accommodate cruise operation. The first compressor section 44 could be operated at a reduced capacity, or not at all in the cruise conditions and engaged during increased thrust demand conditions, such as during takeoff conditions.

Alternatively, according to another example embodiment, the compressor electric motor 54 may drive the first compressor section 44 at a speed different than that of the second compressor section 46. The different speed may be faster or slower than the second compressor section 46 to provide a variable amount of compressed airflow to the combustor 64 to accommodate different engine thrust levels. Moreover, the flow capacities of the first compressor section 44 and the second compressor section 46 may differ while still providing a common pressure of the flows 32A, 32B at the combustor 64.

The disclosed turbine section 26 includes the high pressure turbine 62, an intermediate pressure turbine 92 and a low pressure turbine 96. The designations, "low", "intermediate" and "low" indicated relative operating pressures. The turbine sections 62, 92 and 96 are serially arranged from the combustor section 24 to the fan section 28. The high energy exhaust gas flow 34 expands axially aft through the turbine sections 62, 92 and 96 and exhausts through a core nozzle 25.

The disclosed example engine is arranged to include first, second and third spools 116, 118 and 115. The first spool 116 that includes the high pressure turbine 62, the second high pressure compressor section 46 and the compressor generator 56 all coupled together by shaft 60. The second spool 118 includes the intermediate turbine 92 that is coupled to the turbine generator 104 through shaft 94. The third spool 115 includes the low pressure turbine 96 that is coupled to a portion of the geared architecture 102. The geared architecture 102 is part of a fan drive system 30.

Figure 4:
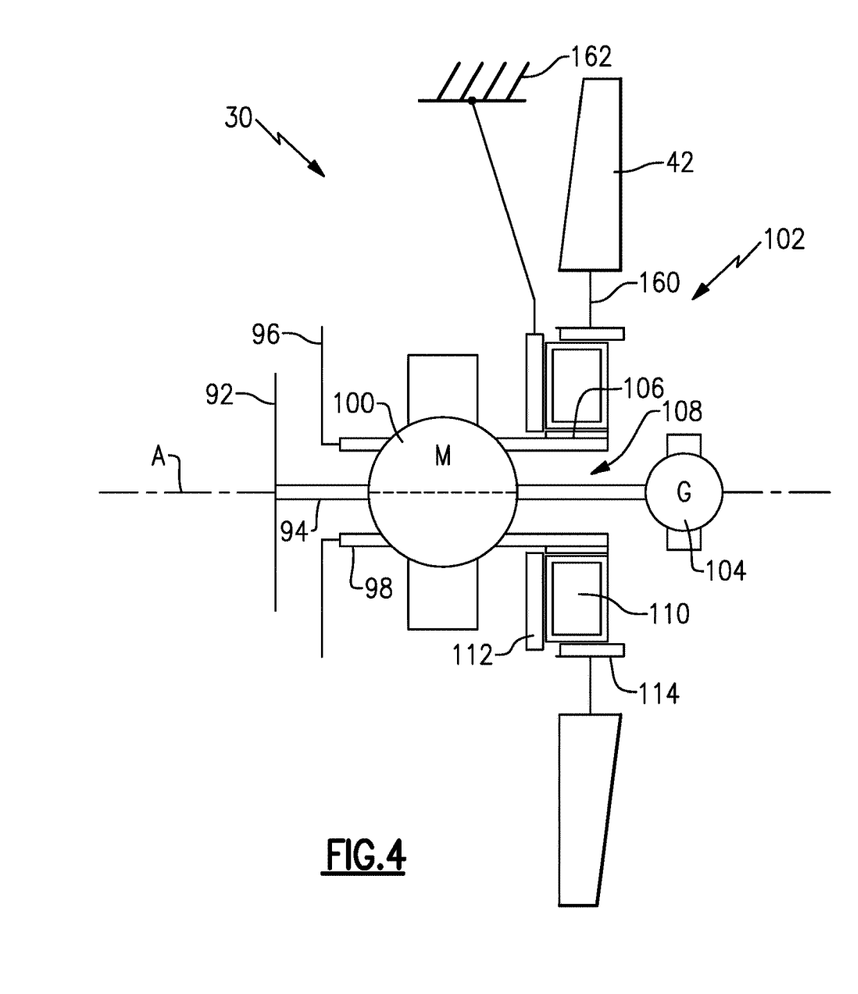
FIG. 4 is a cross-section of an example fan drive system.
Figure 5:
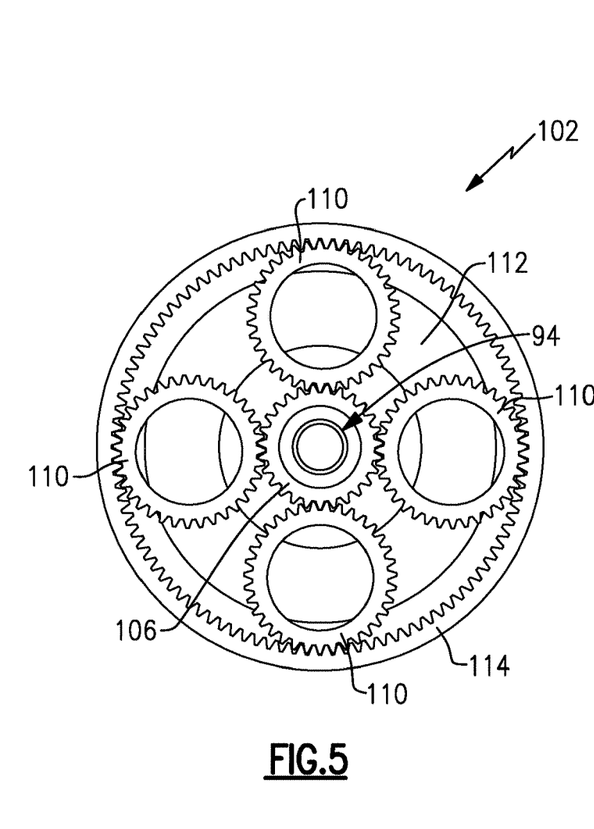
FIG. 5 is a plan view of an example epicyclic gear system.

Referring to FIGS. 4 and 5 with continued reference to FIG. 1, the low pressure turbine 96 and turbine motor 100 are both coupled to the geared architecture 102 to drive rotation of the fan blades 42. The fan blades 42 are attached to a fan shaft 160 coupled to a portion of the geared architecture 102. The geared architecture 102 provides for the fan blades 42 to rotate at a speed different than the low pressure turbine 96. In this example, the shaft 94 passes concentrically within the shaft 98 and through the geared architecture 102 to the generator 104. The intermediate pressure turbine 92 is therefore not directly coupled to the geared architecture 102. Electric power produced by the turbine generator 104 powers the turbine motor 100. The turbine motor 100 is coupled through the shaft 98 to the geared architecture 102 to supplement power to drive the fan section 28.

The geared architecture 102, the intermediate pressure turbine 92, the low pressure turbine 96, the turbine motor 100 and the turbine generator 104 define portions of the fan drive system 30. The disclosed geared architecture 102 is an epicyclic gear system with a sun gear 106 intermeshed with intermediate gears 110. The intermediate gears 110 are supported by a carrier 112. A ring gear 114 is engaged to the intermediate gears 110. In this disclosed example, the fan shaft 160 is coupled to the ring gear 114. However, the fan shaft 160 maybe coupled to the carrier 112.

The intermediate pressure turbine 92 is coupled to the shaft 94 that is coupled to the turbine generator 104. The shaft 94 extends through the hollow interior 108 of the sun gear 106. The shaft 94 is not coupled to the sun gear 106 in this example embodiment. The fan shaft 160 is coupled to the ring gear 114. The low pressure turbine 96 and the turbine motor 100 are both coupled to the shaft 98. The shaft 98 extends through the turbine motor 100 and drives the sun gear 106. The carrier 112 is not coupled to either the low pressure turbine 96 or the intermediate pressure turbine 92. The carrier 112 may be grounded to an engine static structure 162. It should be appreciated that other portions of the geared architecture 102 may be grounded to the engine static structure 162 and are within the contemplation of this disclosure.

Figure 6:
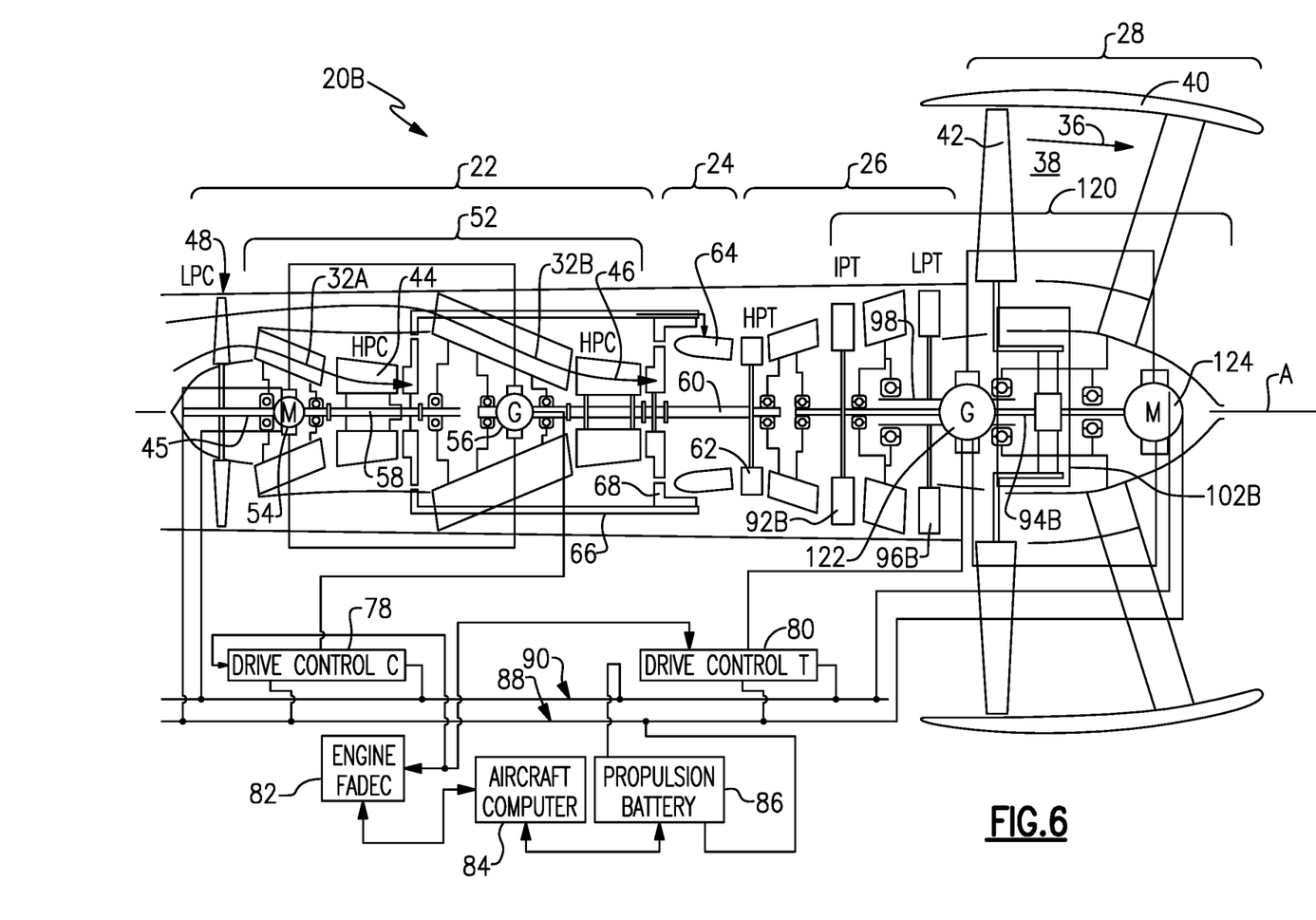
FIG. 6 is a schematic view of another example turbine engine embodiment.
Figure 7:
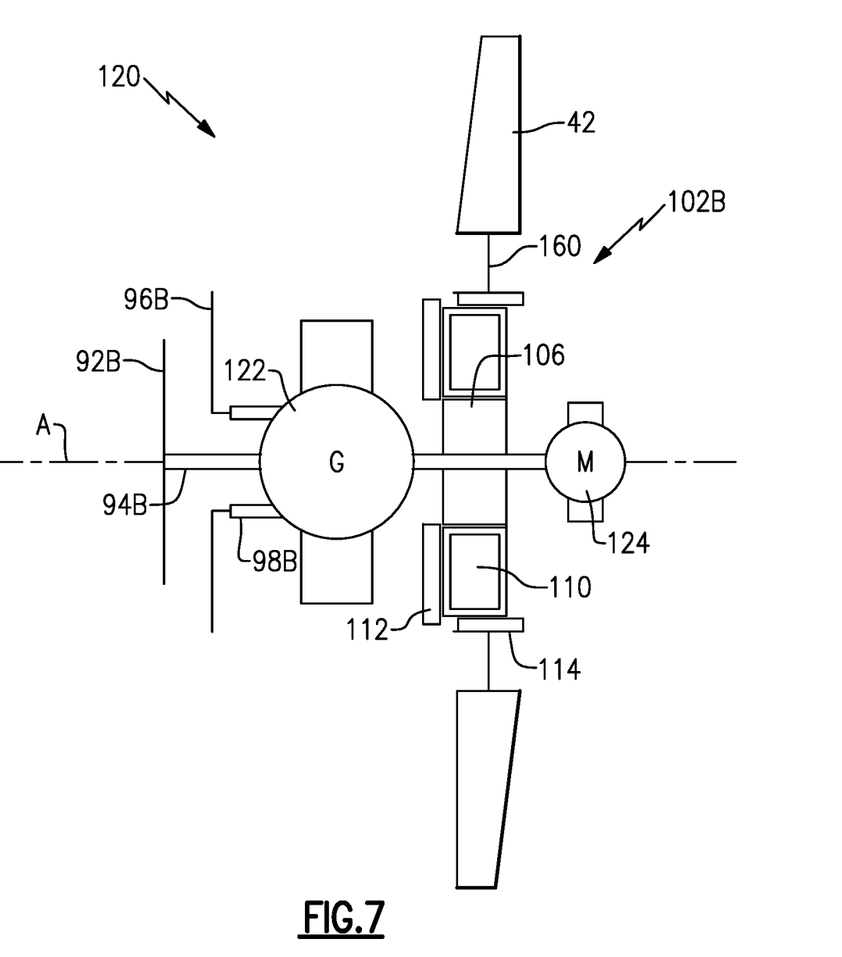
FIG. 7 is a cross-section of another example fan drive system.

Referring to FIGS. 6 and 7, another disclosed turbine engine embodiment is schematically shown and indicated at 20B. The turbine engine 20B includes the same compressor section 22 and combustor section 24 as the previously described turbine engine 20A embodiment. The turbine engine 20B includes an alternate fan drive system 120. The alternate fan drive system 120 includes a turbine generator 122 driven by the low pressure turbine 96B through shaft 98B. The intermediate pressure turbine 92B is coupled to the input of the geared architecture 102B that drives the fan shaft 160. In this disclosed example, the ring gear 114 provides the output to drive the fan blades 42. In this example embodiment, the intermediate pressure turbine 92B is coupled to drive the sun gear 106 by way of shaft 94B. The turbine motor 124 is also coupled to the shaft 94B. The turbine motor 124 inputs power to drive the geared architecture 102B, and thereby the fan blades 42 to improve engine efficiency and reduce loads on the intermediate turbine 92B.

Figure 8:
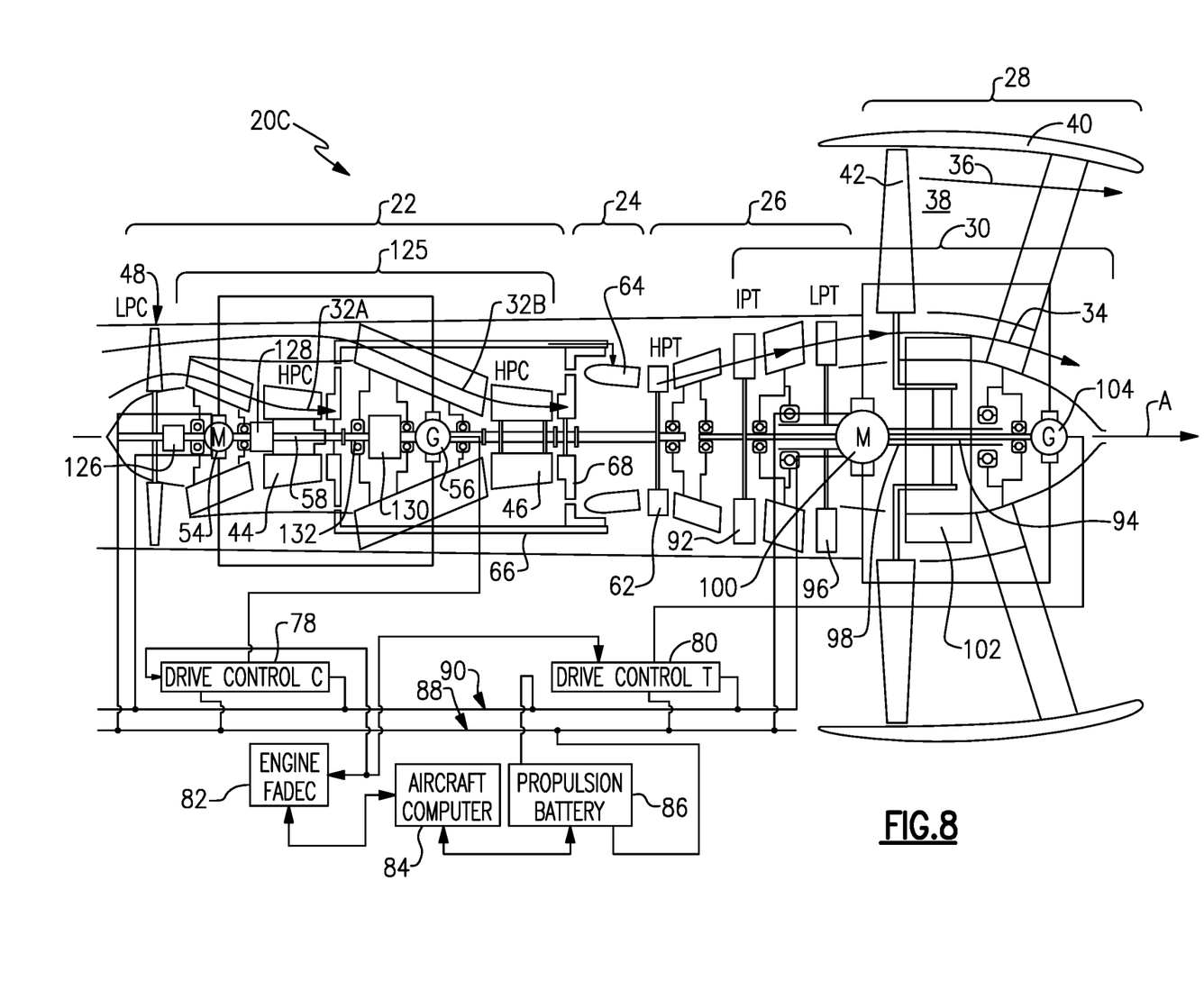
FIG. 8 is a cross-section of another example turbine engine embodiment.

Referring to FIG. 8, another disclosed example turbine engine embodiment is shown and indicated at 20C. The example turbine engine 20C includes similar features to the previous engine embodiments with another example high pressure compressor assembly 125. The example high pressure compressor assembly 125 includes a shaft 132 driven by the high pressure turbine 62 and selectively coupled to drive the first compressor section 44 in addition to the second compressor section 46. Additionally, the low pressure compressor 48 is selectively coupled to the shaft 132. The shaft 132 extends axially forward from the high pressure turbine 62 to the first compressor section 44. First, second and third clutches 126, 128 and 130 selectively couple to the shaft 132.

The first clutch 126 selectively couples the low pressure compressor 48 to provide for supercharging of airflow. The first clutch 126 may include an actuator to provide controlled coupling independent of shaft speed. The first clutch 126 may also be a one-way clutch that couples the low pressure compressor 48 at a defined shaft speed and rotational direction.

The second clutch 128 and the third clutch 130 are actuatable to provide the first compressor section 44 to be driven by the shaft 132 such that the high pressure turbine 62 drives both the first and second compressor sections 44, 46 at a common speed. The third clutch 130 provides for driving of the shaft 132 to drive the first compressor section 44. The second clutch 128 decouples the electric motor 54 from driving the first compressor 44. In some instances, the electric motor 54 may drive the first compressor section 44 at a speed greater than that of the second compressor section 46 driven the high pressure turbine 62. In some instances, the electric motor 54 may drive the low pressure compressor section 48 at a speed greater than that of the first compressor section 44. The selective coupling provided by the second and third clutches 128, 130 smooths operation between the two compressor sections 44, 46 during such transient conditions. The first and second clutches 126, 128 are overriding clutches that operate to couple and decouple based on relative speeds and rotational direction. However, the clutches maybe of other configurations that are controllable independent of shaft speeds.

Referring FIG. 1, the example gas turbine engine 20A includes an electrical system that couples each of the generators 56, 104 to the corresponding motors 54, 100. The turbine generator 104 is electrically coupled to the turbine motor 100 through a drive control T 80. The drive control T 80 is in communication with the engine FADEC 82 and also an aircraft computer 84. In this example, the turbine generator 104 is electrically coupled to the turbine motor 100 to provide matched operation. Electric power to operate the turbine motor 100 may be supplemented by a propulsion battery 86. In the example turbine engine 20A shown in FIG. 1, the turbine generator 104 is driven by the intermediate turbine 92 through a shaft 94. Power input by the turbine motor 104 reduces the power load on the intermediate pressure turbine 92 and low pressure turbine 96. The turbine control T 80 matches and adjusts speeds of the respective turbine section and the turbine motor 104 to drive the fan section 28 at a predefined speed. The turbine generator 104 may be driven by other turbine sections or combinations of turbine sections such as by the low pressure turbine 96B as shown and described with regard to turbine engine 20B shown in FIG. 6. Power input by the turbine motor 124 reduces the power load on the intermediate pressure turbine 92B and low pressure turbine 96B. The turbine control T 80 matches and adjusts speeds of the respective turbine section and the turbine motor 124 to drive the fan section 28 at a predefined speed.

The electric system further provides control of an electrical coupling of the compressor generator 56 and the compressor motor 54 to provide substantially matched operation of the first compressor section 44 and the second compressor section 46. A drive control C 78 controls operation of the compressor generator 56 and the compressor motor 54 to match operation to accommodate engine operation. The drive control C 78 may draw electric power from the propulsion battery 86 to power the compressor electric motor 54. The electric power from the battery 86 may supplement electric power provided by the generator 56. The battery 86 may also provide all the power to the compressor motor 54.

Figure 9:
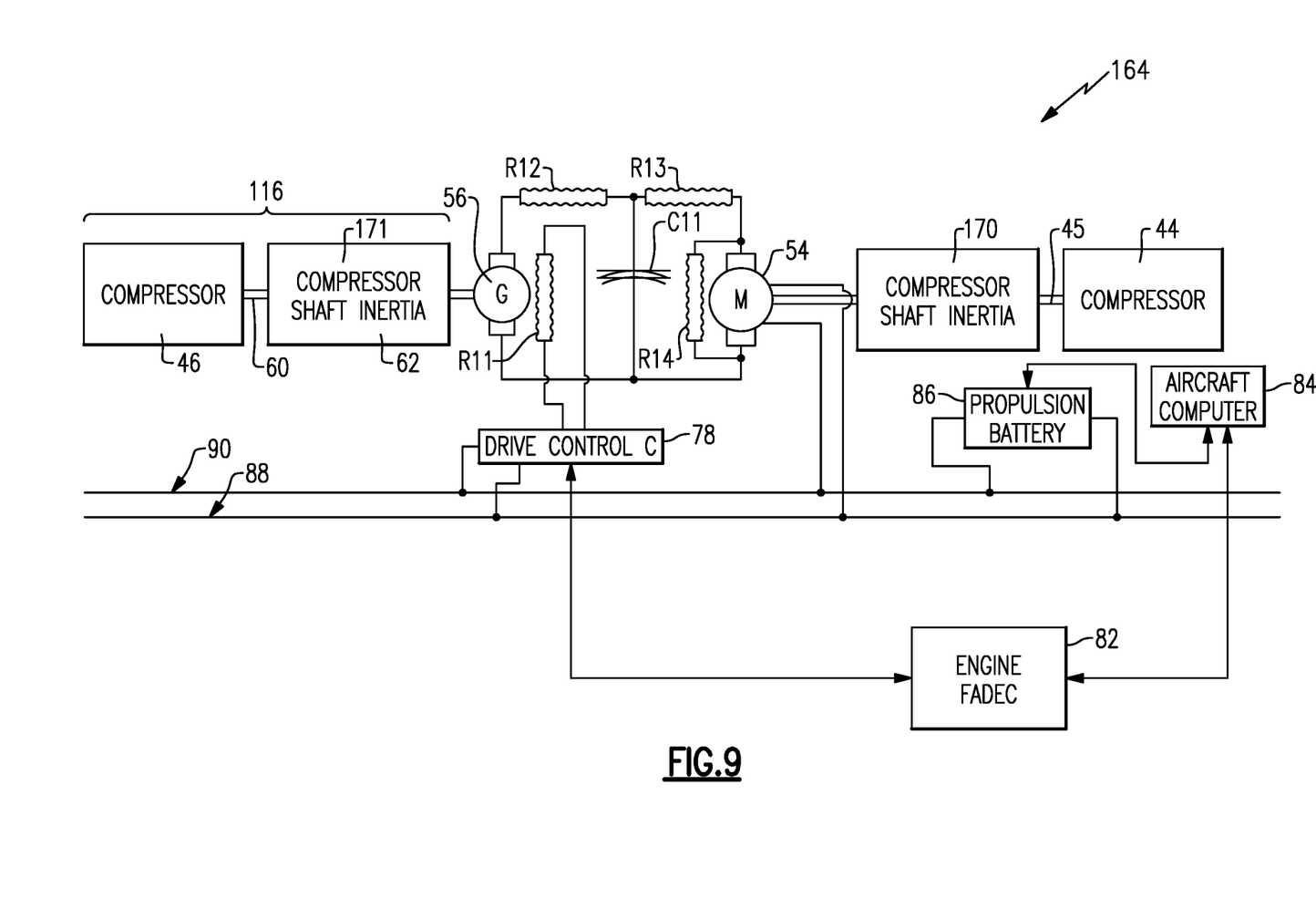
FIG. 9 is a schematic representation of a compressor drive and control system.

Referring to FIG. 9 with continued reference to FIG. 1, a compressor drive and control system 164 is shown schematically. The system 164 provides for coordinating operation between the motor driven first compressor section 44 and the turbine driven second compressor section 46. The first compressor section 44 is driven by rotating structures such as the shaft 45 that generate an inertia schematically indicated at 170. The second compressor section 46 is part of the first spool 116 driven by the high pressure turbine 62 with a different inertia 171. Resistances of the drive control and electrical machines' fields and armatures are indicated at R11, R12, R13, and R14. A capacitance C11 is adjusted to coordinate a speed response of the electric driven first compressor section 44 because inertia of the rotating structures 170 are different from inertial generated by the structures of the first spool 116. The resistance of each of the resistors R11, R12, R13, R14 and the capacitance of the capacitor C11 of the motor 54 and generator 56 are sized in order to coordinate operation of two compressors 44, 46. Operation of the compressor sections 44, 46 provided by the system 164 compensates for differences in flow capacity and rotational speeds to provide substantially the same airflow and pressure at the combustor 64. The control system 164 provides this operation over DC bus circuits 88, 90.

Figure 10:
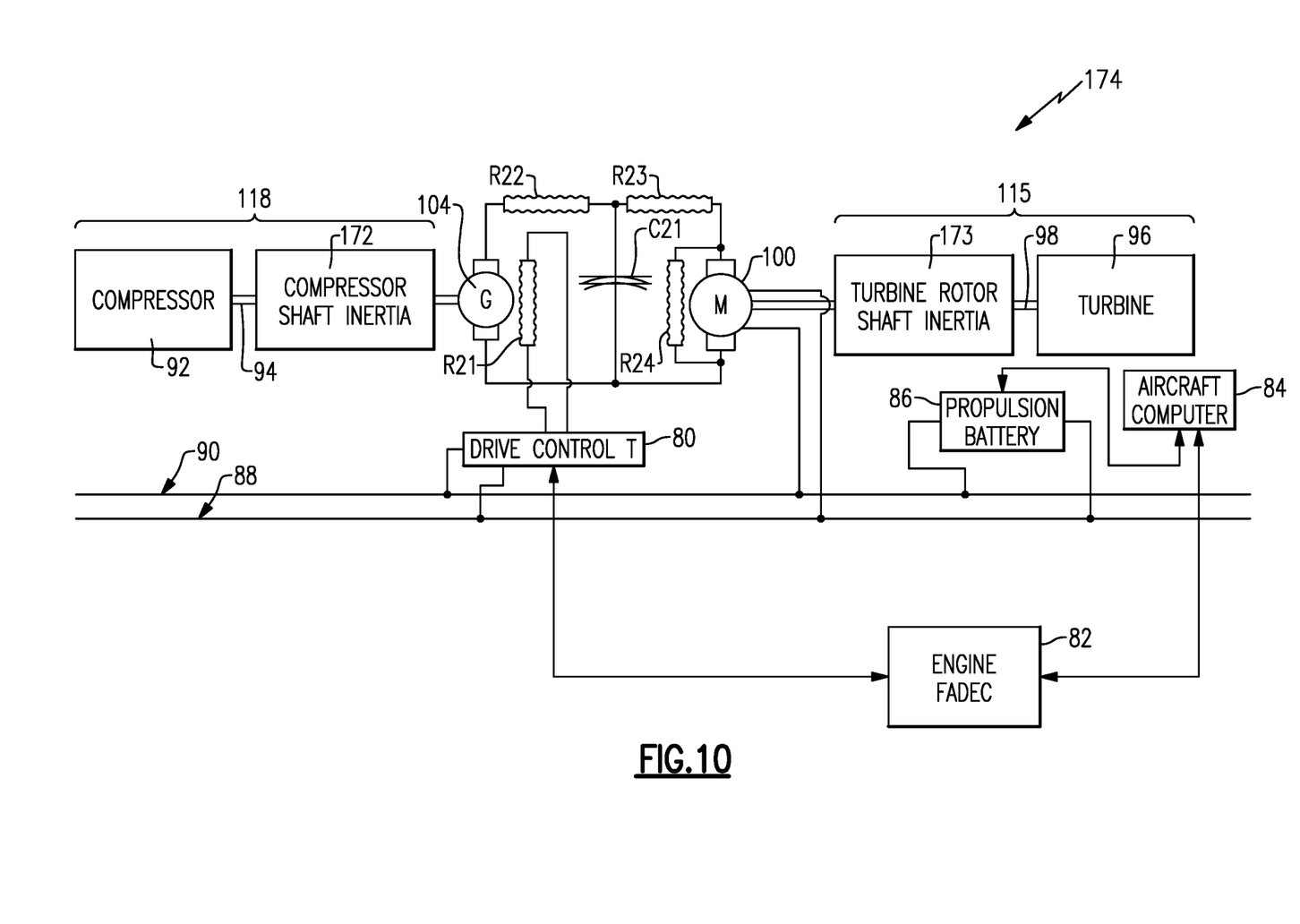
FIG. 10 is a schematic representation of a turbine drive and control system.

Referring to FIG. 10 with continued reference to FIG. 1, turbine drive and control system 174 is schematically shown. The turbine drive and control system 174 provides for coordination between the electric motor assisted third spool 115 and the second spool 118. As appreciated, the example drive and control system 174 is applicable to other drive configurations where power to one spool is supplemented by an electric motor. In this example, the intermediate turbine 92 drives the generator 104 and other rotating structures such as the shaft 94 that combine to generate an inertia schematically indicated at 172. The third spool 115 includes the low pressure turbine 96 that is coupled to the geared architecture (FIG. 4) and the electric turbine motor 100. The third spool 115 includes rotating structures such as the shaft 98 and portions of the geared architecture that combine to generate an inertia 173. The example drive and control system 174 compensates for the differences in speeds and inertias 172, 173 to coordinate operation.

The resistances R21, R22, R23, R24 of the drive control and electrical machines' fields and armatures along with the capacitance C21 is utilized to match and coordinate the speed response of the electric supplemented turbine 96 caused by differences in the inertias. In this example, the inertia 173 can include portions of the geared architecture 102, the fan drive shaft 160 and other fan structures. The inertia 172 is generated by intermediate pressure turbine 92 and load incurred by the generator 104. The resistors R21, R22, R23, R24 and the capacitance C21 are the control parameters that are sized to coordinate operation between the two turbines 92, 96.

Figure 11:
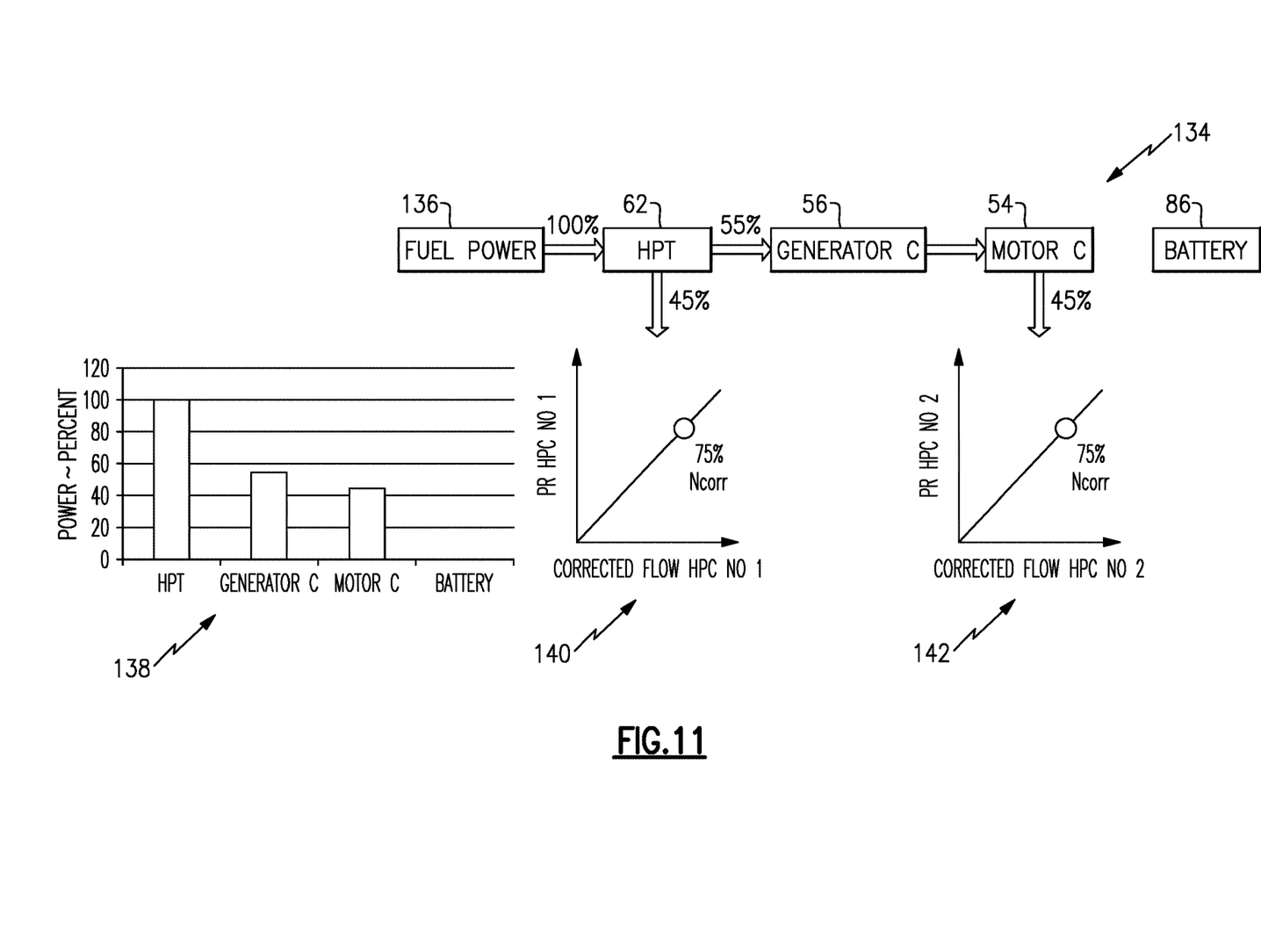
FIG. 11 is a schematic illustration of a power flow of the example compressor section.

Referring to FIG. 11, a diagram is schematically shown and indicated at 134 to illustrate an example mode for controlling power flow of the disclosed high pressure compressor assembly 52. In this example, power generated by the burning of fuel illustrated as fuel power 136 is utilized to drive the high pressure turbine 62. As discussed above, fuel mixed with compressed air is ignited to generate the high energy exhaust gas flow that expands through the high pressure turbine 62. The high pressure turbine 62 converts the gas flow to mechanical power used to drive the second compressor section 46. In the illustrated example, the mechanical power generated from the fuel is split between driving the second compressor section 46 and driving the compressor generator 56. The power to the compressor generator 56 is in turn used to power the compressor motor 54 and ultimately the first compressor section 44. Power from the high pressure turbine 62 directly drives the second compressor section 46. The remaining power, less losses due to the conversion to electric power, is used to drive the compressor electric motor 54. The chart 138 illustrates how the input power to the high pressure turbine 62 flows to the compressor electric motor 54.

In this example, the battery 86 is not utilized to drive the compressor motor 54. As is shown in graphs 140, 142, the compressor sections 44, 46 are operated with a flow that is derived from the power input from the high pressure turbine 62.

Figure 12:
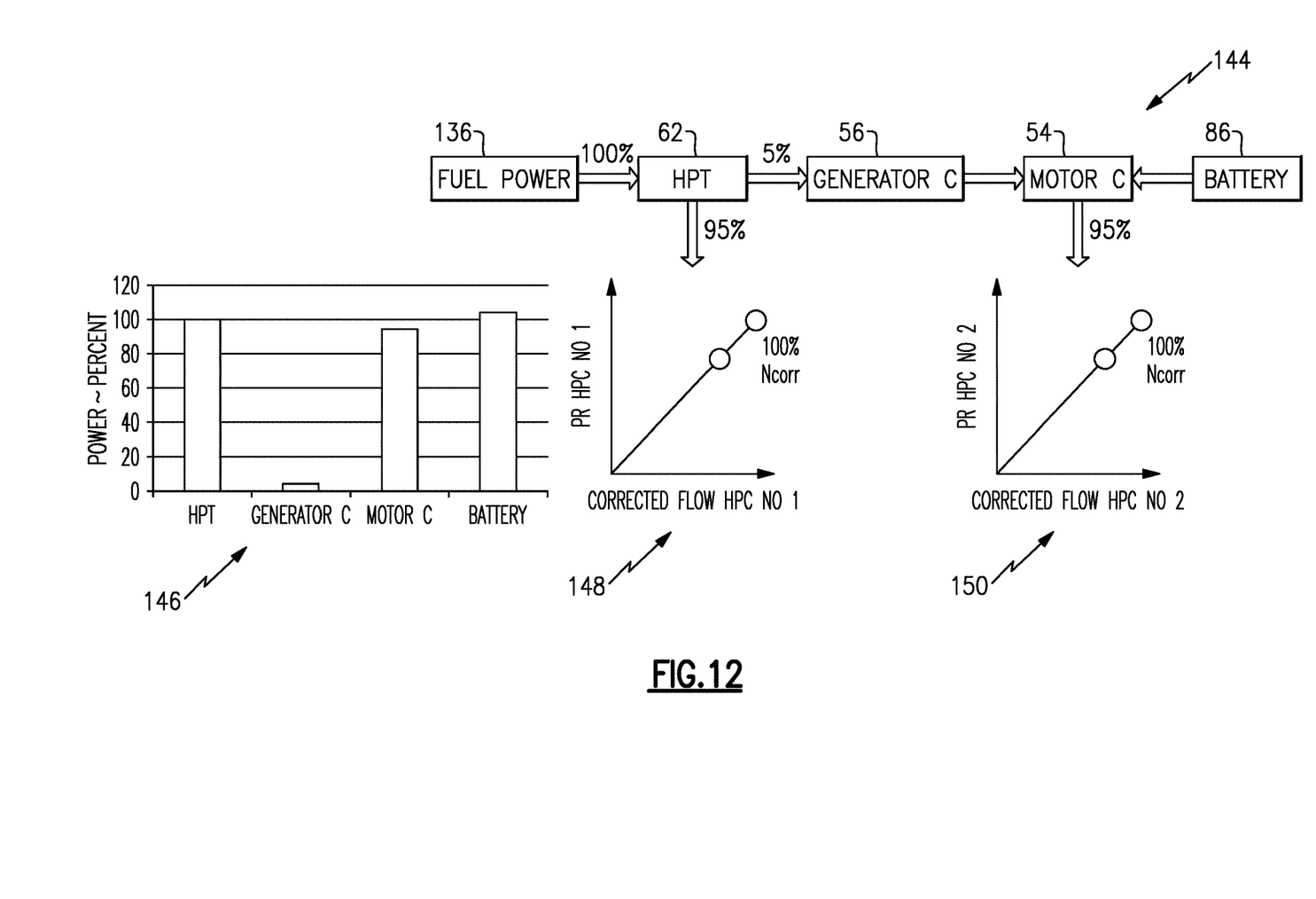
FIG. 12 is another schematic illustration of power flow during another operating condition of the high pressure compressor section.

Referring to FIG. 12, another diagram is schematically shown and indicated at 144 to illustrate another mode of power flow to the disclosed compressor sections 44, 46 when the battery 86 is utilized to supplement power to the compressor electric motor 54. In this example, power input from the battery 86 reduces the demand for power from the high pressure turbine 62 induced by the compressor generator 56. Accordingly, a greater percentage of power from the high pressure turbine 62 can be used to drive the second compressor section 46 as is shown by chart 146. Battery power is provided to the compressor electric motor 54 such that a reduced load is placed on the compressor generator 56 and thereby the high pressure turbine 62. The reduced load on the high pressure turbine 62 in combination with the supplemental power input from the battery 86 provides an overall net increase in compressor operation for both the second compressor section 46 indicated by graph 148 and the first compressor section 44 indicated by graph 150.

Figure 13:
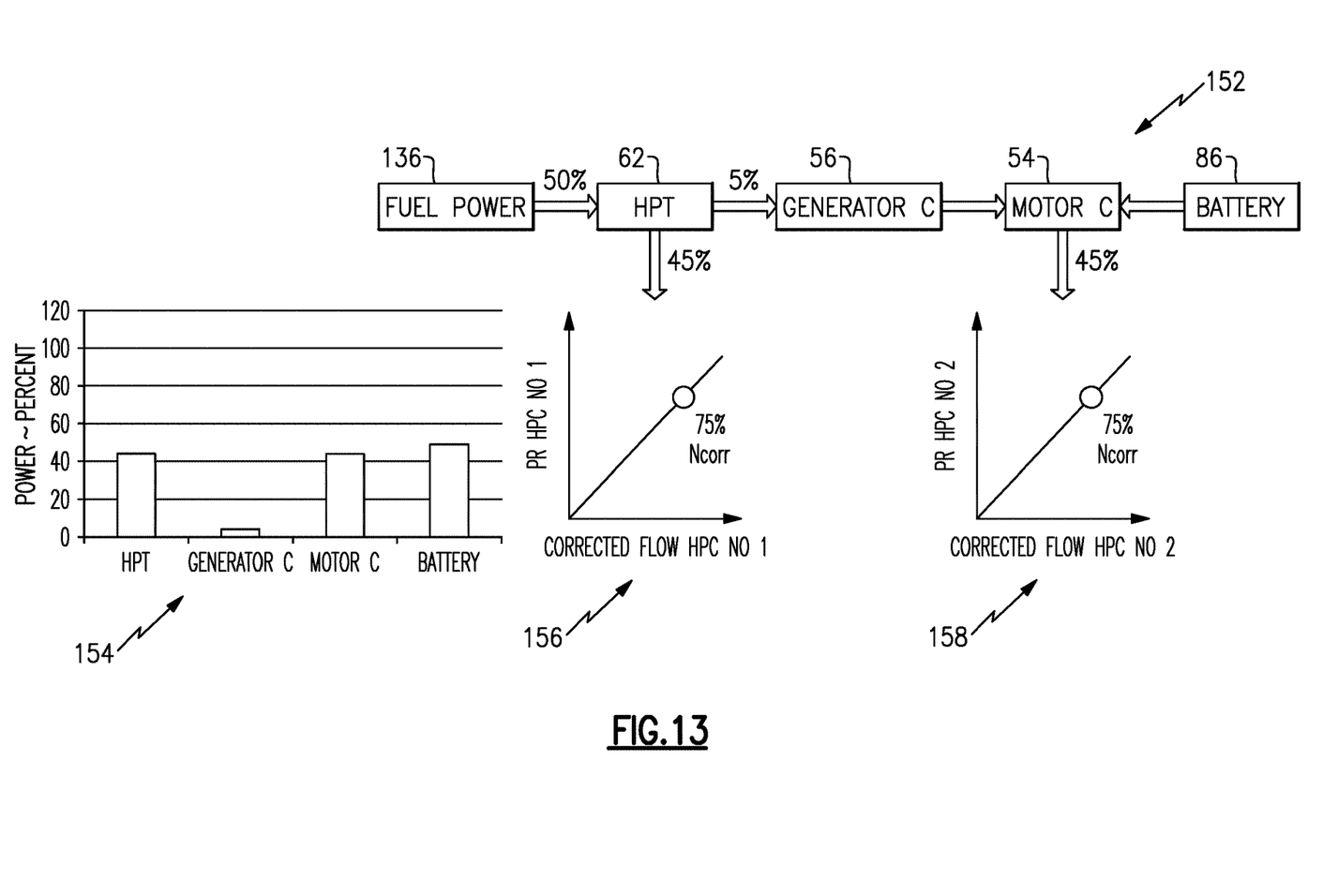
FIG. 13 is another power flow diagram illustrating operation of the example compressor section.

Referring to FIG. 13, another diagram is schematically shown and indicated at 152 that illustrates another example mode of operation where a reduced amount of fuel power 136 is utilized such that the power generated by the high pressure turbine 62 is substantially reduced. Such a reduction of power derived from fuel provides significant fuel savings. Power to drive the first compressor section 44 is supplemented with power from the battery 86 to provide operation at levels substantially the same as those shown in FIG. 11 utilizing a greater amount of fuel power 136.

Accordingly, supplementing operation of the compressor sections 44, 46 by operating the first compressor section 44 with power from a battery 86 can provide significant fuel savings. As is shown by graphs 154, 156 and 158 as compared to graphs 138, 140 and 142 in FIG. 9, substantial equal operation of the compressor sections 44, 46 is provided with half as much power derived from fuel. As is further shown in chart 154, a reduction in power for each of the high pressure turbine 62 and compressor electric generator 56 is provided by drawing power from the battery 86 to supplement compressor operation.

Accordingly, operating a portion of the high pressure compressor section 24 by way of an electric motor 54 reduces loads on the high pressure turbine to provide different operating modes and significant reductions in fuel. Additionally, the example gas turbine engine 20 provides a compressor section 24 that is split such that it may supply the gas generator airflow for significantly greater engine efficiencies.

The disclosed integrated electro-aero-thermal turbine engines provide thrust specific fuel consumption (TSFC) improvements and aircraft fuel burn reduction due to both improved gas turbine thermal efficiency and battery assistance to drive the fan or propeller. Other improvements include more optimal control and management of transient and steady state engine operation Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine comprising:
a high pressure compressor section including a first compressor section and a second compressor section disposed serially along an engine longitudinal axis, the first compressor section is axially forward of the second compressor section and is configured to be driven separately from the second compressor section;

a compressor motor coupled to drive the first compressor section;

a combustor in flow communication with both the first compressor section and the second compressor section of the high pressure compressor section;

a first turbine section in flow communication with the combustor and coupled to drive second compressor section; and a fan drive system axially aft of the first turbine section and configured to drive a fan section, the fan drive system including a second turbine section, a turbine motor and a geared architecture, wherein the second turbine section and the turbine motor are coupled to portions of the geared architecture to drive the fan section.

2. The turbine engine as recited in claim 1, including a compressor generator coupled to be driven by the first turbine section, the compressor generator electrically coupled to provide electric power to the compressor motor.

3. The turbine engine as recited in claim 2, including a first clutch configured to selectively couple a shaft driven by the first turbine section to the first compressor section and a second clutch configured to decouple the compressor motor from driving the first compressor section such that the first turbine section is coupled to drive both the first compressor section and the second compressor section.

4. The turbine engine as recited in claim 2, including a compressor drive control that matches operation of the compressor generator to output requirements of the compressor motor to coordinate operation of the second compressor section with operation of the first compressor section.

5. The turbine engine as recited in claim 2, wherein the second turbine section includes an intermediate turbine coupled to drive a turbine generator and a low turbine coupled to a portion of the geared architecture, the turbine generator electrically coupled to provide electric power to the turbine motor.

6. The turbine engine as recited in claim 5, including a turbine drive control that matches operation of the turbine generator to output requirements of the turbine motor.

7. The turbine engine as recited in claim 5, wherein the geared architecture includes a sun gear intermeshed with intermediate gears supported in a carrier and a ring gear circumscribing the intermediate gears and the low turbine and the turbine motor are coupled to the sun gear and the fan section is coupled to be driven by the ring gear.

8. The turbine engine as recited in claim 7, including an intermediate shaft coupling the intermediate pressure turbine to the turbine generator through a central opening in the sun gear.

9. The turbine engine as recited in claim 2, wherein the geared architecture includes a sun gear intermeshed with intermediate gears supported in a carrier and a ring gear circumscribing the intermediate gears and the second turbine section includes an intermediate turbine coupled to drive the sun gear and a low turbine coupled to drive a turbine generator electrically coupled to provide electric power to the turbine motor.

10. The turbine engine as recited in claim 5, including a battery system electrically coupled to each of the turbine motor and the compressor motor to supplement power provided by a corresponding one of the turbine generator and the compressor generator.

11. The turbine engine as recited in claim 1, including a diffuser configured to communicate airflow from the first compressor section and the second compressor section separately to the combustor.

12. The turbine engine as recited in claim 11, wherein the diffuser comprises a plurality of first conduits that extend from the first compressor section to the combustor and a plurality of second conduits that extend from the second compressor section to the combustor, wherein the plurality of first conduits and the plurality of second conduits alternate circumferentially about the combustor.

13. The turbine engine as recited in claim 1, including a low pressure compressor forward of the high pressure compressor section, the low pressure compressor coupled to be driven by the compressor motor.

14. The turbine engine as recited in claim 13, including a low pressure compressor clutch disposed between the compressor motor that is configured to selectively engage operation of the low pressure compressor.

15. The turbine engine as recited in claim 1, including an inner duct configured to communicate core flow to the first compressor section and an outer duct configured to communicate core flow to the second compressor section.

16. The compressor section as recited in claim 1, wherein the first compressor section and the second compressor section generate a total output airflow communicated to the combustor, wherein the total output airflow comprises a first output airflow from the first compressor section and a second output airflow from the second compressor section.

17. A method of operating a turbine engine comprising:

coupling a first compressor section to a first turbine;

coupling a second compressor section to a compressor motor;

generating a first airflow from the first compressor section separate from a second airflow generated by the second compressor section;

configuring a combustor to receive the first airflow independent from the second airflow; and coupling a fan to a fan drive system disposed aft of the combustor, wherein the fan drive system includes a second turbine section, a turbine motor and a geared architecture, wherein the second turbine section and the turbine motor are coupled to drive the fan through the geared architecture.

18. The method as recited in claim 17, including driving a compressor generator with the first turbine and electrically coupling the compressor generator to drive the compressor motor.

19. The method as recited in claim 17, including driving a turbine generator with the second turbine section and electrically coupling the turbine generator to drive the turbine motor.

20. The method as recited in claim 17, including supplementing power transferred through the geared architecture with the turbine motor; and electrically coupling a battery system to each of the turbine motor and the compressor motor to supplement electric power provided by a corresponding one of a turbine generator and a compressor generator.

\* \* \* \* \*